3,138,611
PHTHALOCYANINE DYESTUFFS
Christian Zickendraht, Binningen, and Arthur Buehler, Rheinfelden, Switzerland, assignors to Ciba Limited, Basel, Switzerland, a company of Switzerland
No Drawing. Filed Sept. 25, 1961, Ser. No. 140,228
Claims priority, application Switzerland Sept. 26, 1960
6 Claims. (Cl. 260—314.5)

The present invention provides as valuable new dyestuffs, which possess an excellent solubility in organic solvents, more especially aromatic hydrocarbons such as benzine, benzene,, toluene or xylene, phthalocyanine sulphonic acid amides of which each amide-nitrogen atom has bound thereto an alkoxy-alkyl group containing 11 to 30, and advantageously 12 to 18, carbon atoms in the alkoxy group. Examples of alkoxyalkyl groups are lauryloxy-, myristyloxy-, stearyloxy- and behenyloxy-propyl and -ethyl groups.

The invention also provides a process for the manufacture of the new dyestuffs, wherein a phthalocyanine sulphonic acid halide of the kind referred to in the above specification is reacted with an alkoxyalkylamine of which the alkoxy group contains 11 to 30, and advantageously 12 to 18, carbon atoms.

It is of advantage to use phthalocyanine tetrasulphochlorides in a very pure state, as they give especially valuable results. They can be made, for example, by reacting a phthalocyanine sulphonic acid or an unsulphonated phthalocyanine with chlorosulphonic acid at a raised temperature, that is to say, a temperature above 100° C., for example, ranging from 120° C. to 140° C., and, before isolating the phthalocyanine tetrasulphochloride formed, treating the reaction mixture with thionyl chloride.

The treatment of the reaction mixture obtained in known manner with thionyl chloride is advantageously carried out at a temperature not exceeding 85° C. The tetrasulphochloride formed can then be isolated from the reaction mixture in usual manner, for example, by pouring the mixture into ice water. In this manner there are obtained very pure phthalocyanine sulphonyl chlorides which are especially suitable for reaction with alkoxyalkylamines in the process of the invention.

The reaction of the phthalocyanine sulphonyl halides with the aforesaid alkoxyalkylamines containing 11 to 30 carbon atoms in the alkoxy group is preferably carried out in an aqueous medium in the presence of an agent capable of binding acids, such as an alkali metal hydroxide, an alkaline earth metal hydroxide, an alkali metal carbonate, sodium acetate or a tertiary base, such as triethanolamine or pyridine. If desired, there may be used as acid-binding agent an excess of the alkoxyalkylamine used for the reaction, and the unreacted amine can be subsequently regenerated from its hydrochloride for use in further reactions with phthalocyanine sulphonyl chlorides. The reaction temperature may vary within very wide limits, but is advantageously a low temperature, for example, ranging from 20° C. to 40° C. It is important to use phthalocyanine sulphonyl chlorides which are free from salt-forming groups, for example, sulphonic acid groups not converted into sulphochloride groups, and which can be prepared, for example, by the method described above.

The dyestuffs of the invention are soluble in organic solvents, especially in aromatic hydrocarbons such as benzine, benzene, toluene, xylene. They are suitable for colouring natural or synthetic resins, waxes, lacquers and plastics, for example, those of cellulose ethers or esters, and bakeable alkyd-melamine lacquers, and also for colouring natural or synthetic polymers or condensation products.

The dyestuffs of the invention can be used, for example, for colouring alkyd resins or alkyl-melamine resins clear blue tints that are fast to light.

The following examples illustrate the invention the parts and percentages being by weight:

*Example 1*

In the course of one hour 193 parts of copper phthalocyanine are introduced into 1500 parts of chlorosulphonic acid. While being stirred, the mixture is heated for 1 hour at 70 to 75° C., and then the temperature is raised to 130–135° C. in the course of 1½ hours. At that temperature the reaction mixture is stirred for 4 hours, and then cooled to 80° C. In the course of 1 hour 600 parts of thionyl chloride are then added dropwise, and the mixture is stirred for a further hour at 75–80° C. After being cooled to room temperature, the mixture is poured on to ice. The copper phthalocyanine tetrasulphonyl chloride is filtered off with suction, and washed with water until the washings are neutral.

The resulting paste is stirred into 3000 parts of water, and, after the addition of 320 parts of lauryloxy-propylamine and 100 parts of sodium bicarbonate, the mixture is stirred for 12 hours at 35–40° C. It is then diluted with 3000 parts of water, and the resulting acid amide is filtered off. It is a blue water-insoluble powder, which is readily soluble in benzene and similar aromatic hydrocarbons. A solution of this dyestuff in nitrocellulose lacquer produces on suitable substrata greenish blue colouring that are fast to light.

Similar products are obtained by reacting the copper phthalocyanine tetrasulphonyl chloride with stearyloxy-ethylamine or stearyloxypropylamine. The reaction of copper phthalocyanine trisulphonyl chloride or nickel phthalocyanine tetrasulphonyl chloride with lauryloxy-propylamine also produces products which are soluble in organic solvents and produce green-blue colourings.

*Example 2*

89.6 parts of sodium copper phthalocyanine-4:4':4":4'''-tetrasulphonate are introduced into 525 parts of chlorosulphonic acid. The mixture is stirred for one hour at 70 to 75° C., the temperature is then raised in the course of 1½ hours to 130–135° C., and maintained at that temperature for 4 hours. The mixture is cooled to 70° C., 195 parts of thionyl chloride are added dropwise in the course of one hour, and then the mixture is stirred for 4 hours at 80 to 85° C. The mixture is then poured on to ice, and the tetrasulphochloride is filtered off and washed with water until the washings are neutral. The tetrasulphochloride is reacted with lauryloxypropylamine in the manner described in Example 1. The dyestuff so obtained is in the dry state a blue powder which is readily soluble in aromatic hydrocarbons, such as benzine and benzene. A solution of the new dyestuff in nitrocellulose lacquer produces on suitable substrata greenish blue colourings which are fast to light.

*Example 3*

To a solution of 12 parts of the dyestuff of Example 1 in 100 parts of toluene are added 900 parts of alkyd-melamine resin, and, dissolution is brought about by stirring well. The resulting lacquer can be applied to foils or other suitable substrata by printing, spraying, brushing or dipping, followed by hardening for 1½ hours at 120° C. A bright transparent greenish blue colouring is obtained.

What is claimed is:
1. Phthalocyanine tetrasulfonic acid amide selected from the group consisting of copper phthalocyanine tetrasulfonic acid amide and nickel phthalocyanine tetrasulfonic acid amide, each amide nitrogen of which has bound thereto an unsubstituted alkoxy-alkyl group of 11 to 30 carbon atoms in the alkoxy group and 2 to 3 carbon atoms in the alkyl chain.

2. Copper phthalocyanine tetrasulfonic acid amide, each amide nitrogen of which has bound thereto an unsubstituted alkoxy-alkyl group of 12 to 18 carbon atoms in the alkoxy group and 2 to 3 carbon atoms in the alkyl chain.

3. The copper phthalocyanine tetrasulfonic-acid-amide of which each amide-nitrogen atom has bound thereto an unsubstituted lauryloxypropyl group.

4. The copper phthalocyanine tetrasulfonic-acid-amide of which each amide-nitrogen atom has bound thereto an unsubstituted lauryloxyethyl group.

5. The copper phthalocyanine tetrasulfonic-acid-amide of which each amide-nitrogen atom has bound thereto an unsubstituted behenyloxypropyl group.

6. The copper phthalocyanine tetrasulfonic-acid-amide of which each amide-nitrogen atom has bound thereto an unsubstituted stearyloxypropyl group.

References Cited in the file of this patent

UNITED STATES PATENTS 2,897,207   Zickendraht et al. _____ July 28, 1959